US012652736B2

(12) United States Patent
Wray

(10) Patent No.: US 12,652,736 B2
(45) Date of Patent: Jun. 9, 2026

(54) CONSTANT VOLTAGE PWM TO CONSTANT CURRENT PWM LED LIGHTING SYSTEM WITH THERMAL AND CURRENT FEEDBACK

(71) Applicant: USAI, LLC, New Windsor, NY (US)

(72) Inventor: Donald L. Wray, Ocala, FL (US)

(73) Assignee: USAI, LLC, New Windsor, NY (US)

( * ) Notice: Subject to any disclaimer, the term of this patent is extended or adjusted under 35 U.S.C. 154(b) by 109 days.

(21) Appl. No.: 18/496,553

(22) Filed: Oct. 27, 2023

(65) Prior Publication Data

US 2024/0147588 A1 May 2, 2024

Related U.S. Application Data

(60) Provisional application No. 63/419,841, filed on Oct. 27, 2022.

(51) Int. Cl.
*H05B 45/325* (2020.01)
*H05B 45/395* (2020.01)
*H05B 45/59* (2022.01)

(52) U.S. Cl.
CPC ......... *H05B 45/325* (2020.01); *H05B 45/395* (2020.01); *H05B 45/59* (2022.01)

(58) Field of Classification Search
None
See application file for complete search history.

(56) References Cited

U.S. PATENT DOCUMENTS

2013/0113389 A1* 5/2013 Roberts .................. H05B 45/18 315/287
2016/0081145 A1* 3/2016 Peeters .................... A01G 9/20 315/185 R
2019/0191507 A1* 6/2019 Wang .................. H05B 45/345

OTHER PUBLICATIONS

"Adjustabel Precision Shunt Regulators" AZ431A; Diodes Incorporated; Document No. DS36721; ; Rev. 6-2; Mar. 2018; pp. 1-19; www.diodes.com.
"Low Voltage (1.24V) Adjustable Precision Shunt Regulator" AZ431L; Diodes Incorporated; Document No. DS36801; ; Rev. 4-2; Mar. 2018; pp. 1-20; www.diodes.com.

* cited by examiner

*Primary Examiner* — Kenneth B Wells
(74) *Attorney, Agent, or Firm* — Farber LLC; Fritz L. Schweitzer, III

(57) ABSTRACT

A light emitting diode (LED) lighting system has a LED light fixture with a channel having a LED string, and has a controller adapted to receive a power input and a control input, and to provide a constant voltage pulse-width modulated (PWM) power to the channel in response to the control input. The channel has a series regulator operable to convert the constant voltage PWM power to constant current PWM power to regulate current through the LED string. The series regulator proves an internal voltage reference and internal temperature compensation and is operable to regulate the current through the LED string with high precision over a wide temperature range, and is powered solely by the constant voltage PWM power. The lighting system is operable to dim the LED string from 100 percent to zero or near zero percent at high PWM frequencies without perceptible flicker or jitter.

16 Claims, 7 Drawing Sheets

CONSTANT VOLTAGE PWM TO CONSTANT CURRENT PWM LED LIGHTING SYSTEM WITH THERMAL AND CURRENT FEEDBACK

FIELD OF THE INVENTION

The invention relates to an LED lighting system, and more particularly, to a LED lighting system that provides constant current without the need for an external feedback circuit and provides for temperature compensation.

BACKGROUND OF THE INVENTION

LED light fixtures have become increasingly popular for use in lighting applications due to their low power consumption, long life span, the ability to carefully control the brightness and the color of the light emitted by the light fixture, and the ease of installation due in part to the ability to use low voltage wiring.

LED light fixtures may have a single color-channel (e.g., white) or may have multiple color channels so as to provide for varying the perceived color output of the fixture. For example, an LED light fixture may have four color channels, one for each of Red, Green, Blue and White (RGBW), where each channel includes a string of one or more LEDs adapted to emit light of the corresponding color. The perceived color output of the LED light fixture can be adjusted by varying the relative intensities of the various color channels to achieve a wide range of intensities and perceived color output.

LED light fixtures may be controlled by a technique called Pulse Width Modulation (PWM), which provides a high-frequency, variable pulse width for rapidly turning the LEDs On/Off based on the duration (i.e., width or "duty cycle") of a voltage signal, for the purpose of varying the intensity or brightness of the LEDs (i.e., dimming) and/or the perceived color output.

For proper control and functioning of the LED light fixtures, they should be provided with a constant and consistent current (e.g., during each ON cycle in a PWM signal). Traditionally, a Field Effect Transistor (FET) has been used for this purpose as it is possible to bias the gate to provide a constant voltage output. However, this alone is not satisfactory as a feedback circuit is needed to provide for ongoing adjustment. One common technique is to use an Op Amp with a dedicated (e.g., "pony") power supply.

However, the space provided for local (e.g., in-fixture) drivers for LED light fixtures is often very small and the space needed to provide for external components is difficult to accommodate. In addition, variations in temperature of an LED light fixture over time (and variations in temperature among multiple LED light fixtures) can cause undesirable variations in current and in the emitted light.

As such, one problem that must be addressed is how to control one LED light fixture, or a plurality of LED light fixtures, connected to a controller where a constant and consistent current is needed, without the use of external components that take up space (e.g., an Op Amp and an additional "pony" constant voltage power supply) or that are subject to voltage fluctuations due to temperature changes.

It should be noted that, when using a PMW technique the inputs of the connected LED light fixtures do not receive a steady DC voltage. Rather, the input is a PWM DC voltage, and this signal is typically not current regulated by the controller to directly drive the LEDs associated with the connected light fixtures.

One configuration for connecting LED light fixtures to a common controller is via a parallel connection. Theoretically, parallel connected-loads all receive the same voltage as they are each directly connected to the voltage source. However, in practice, it has been seen that LED light fixtures connected in parallel see voltage variations between LED light fixtures. This observed variation is due to the resistance in the cable extending from one LED light fixture to the next. While the resistance between LED light fixtures is relatively small, the variation can result in a slightly different voltage being applied to each LED light fixture with the voltage applied to each fixture becoming smaller the longer the wire run is from the controller. This minor variation in voltage makes it difficult to provide a steady PWM current source for each of the fixtures so that LED brightness, flicker, and other common issues with LED lights can be properly mitigated.

One approach to controlling parallel-connected LEDs is to balance the current in different strings of LEDs by providing the same number and type of LEDs in each parallel string. However, often it is desired to provide not only a different number of LEDs on different strings of lights, but also to provide different types of LED lights on different strings. Balancing current between strings is therefore not a desirable approach.

Additionally, to provide a constant current to various LED light fixtures has required the use of a separate power source when the control signal is a PWM or other On/Off control signal.

SUMMARY OF THE INVENTION

What is desired is to provide a system and method for controlling an LED light fixture using PWM and a constant current, but does not utilize an external feedback circuit, such as an Op Amp with a constant voltage power supply, and solely uses a 2-wire connection between the controller and the LED light fixture (or each color channel thereof) to power and control the LED light fixture.

It is further desired to provide a system and method for controlling an LED light fixture using PWM and a constant current and that is not negatively impacted by a change in temperature, and solely uses a 2-wire connection between the controller and the LED light fixture (or each color channel thereof) to power and control the LED light fixture.

It is still further desired to provide a system and method for controlling an LED light fixture using PWM and a constant current that is connected to a plurality of parallel-connected LED light fixtures even with relatively long wire runs from the controller, and solely uses a 2-wire connection between the controller and the LED light fixtures (or each color channel thereof) to power and control the LED light fixtures.

It is also desired to provide a system and method for controlling an LED light fixture using PWM and a constant current but does not require an equal number of LEDs on different strings and can accommodate different types of LED light fixtures without negatively impacting the constant current.

It is still further desired to provide a system and method for providing constant current to and for controlling an LED light fixture with only a PWM signal sent to the LED light fixture (or each color channel thereof).

These and other objects are achieved in one configuration by the provision of a low-cost, small size LED driver that transforms constant voltage PWM power to constant current PWM power, which is temperature-compensated and has a low drop out to power LEDs on at least one lighting fixture, or on a parallel-connected group of LED light fixtures, preferably for each color channel.

This is achieved by providing a unique voltage reference in an internal feedback circuit that is temperature compensated. The use of a precision reference (as opposed to a Zener diode) allows for this improvement. A challenge that needed to be addressed is that since all prior methods provided are linear drivers, it is important to match the LED forward bias voltage to the constant voltage input source (match LED voltage and cable drop to the power supply). The present design controls current in different LED light fixtures when the source power is only pulse width or another On/Off type of control in a remote light fixture. This allows for the use of a different number of LEDs between strings and different types of light fixtures on different strings. However, this configuration for control means that the only power available is the power received by or coming into the LED light fixture, which in this case is a PWM signal. In other words, there is no "local" or dedicated power on each light fixture to power up active components. However, using a series regulator provides the ability to function at very low currents, which allows very low dimming. The use of the series regulator also allows for the constant current regulation of the LEDs with the added benefit of internal temperature compensation of the voltage reference to control for temperature drifts in the FET and in the LEDs.

This system is provided with very low input capacitance and can be isolated by relatively high resistance allowing the system to dim to true zero. Also provided is a $V_{REF}$ on a FET that is independent of the output source. In one configuration, a capacitor on the gate of a FET eliminates jitter at very narrow PWM levels such that the circuit goes into a truly analog mode allowing for true zero and stable flicker-free dimming at very narrow PWM pulse widths.

In one configuration, a constant voltage PWM input (+Vinput)) from a controller is provided to a relatively high input resistance. The input resistance is then connected to a cathode of a regulation circuit as shown in the drawings and is further connected to the gate of the FET and finally to the negative (−Vinput), optionally via a second resistance. A reference terminal (REF) of the regulation circuit is then connected to the source of the FET and to a third resistor, which is also connected to the anode of the regulation circuit. A capacitor is connected between the gate and the negative-Vinput. The regulation circuit includes an internal voltage reference (VREF) and compensates for variations in temperature. The LED light engine (the LEDs in each LED light fixture) is connected at a first end to +Vinput and at a second end to the drain of the FET.

This configuration provides for true constant current control while at the same time, automatically adjusts for variations in temperature.

Other objects of the invention and its features and advantages will become more apparent from consideration of the following drawings and accompanying description.

DETAILED DESCRIPTION OF THE INVENTION

Figure 1:
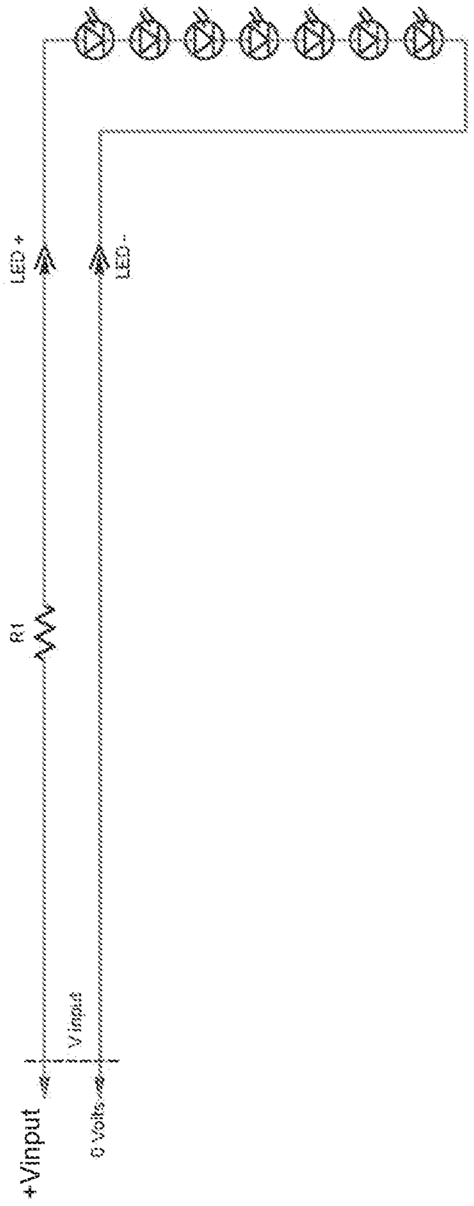
FIG. 1 Prior Art
FIG. 1 is a schematic diagram of a simple resistive configuration according to the prior art.

Referring to FIG. 1, a simple resistive regulation configuration for a single LED light fixture having a single color-channel with a single LED string(S) of one or more LEDs is shown according to the prior art. A plurality of such light fixtures can be connected in parallel to a common controller providing constant voltage pulse-width modulated (PWM) power and control, or each light fixture could be independently connected to a dedicated controller (or a combination of parallel and independent connections).

Theoretically, the circuit disclosed in FIG. 1 will provide essentially the same voltage (VLED) to the LED string of each of a plurality of independent or parallel-connected LED light fixtures, provided that the resistance value (R1) is sufficiently high. It assumes that the voltage (VLED) to each LED light fixture will be the same, that any difference in voltage (A VLED) between the connected LED light fixtures can be tolerated, and that VLED will not change as the temperature changes. This is simply not the case in the actual functioning of such devices. For example, it has been observed that the voltage drop on the cable between multiple LED light fixtures will introduce an error in the LED current in each fixture.

This resistive regulation configuration is the simplest and lowest cost method for creating a semi-constant (and semi-consistent) current source to drive the LED's. However, this technique is best utilized when the input voltage is constant, and the LED string voltage is the same and the temperature is the same in all the fixtures. However, such conditions are rare and inconsistent, and therefore this technique is not practical in high quality LED lighting fixtures.

Figure 2:
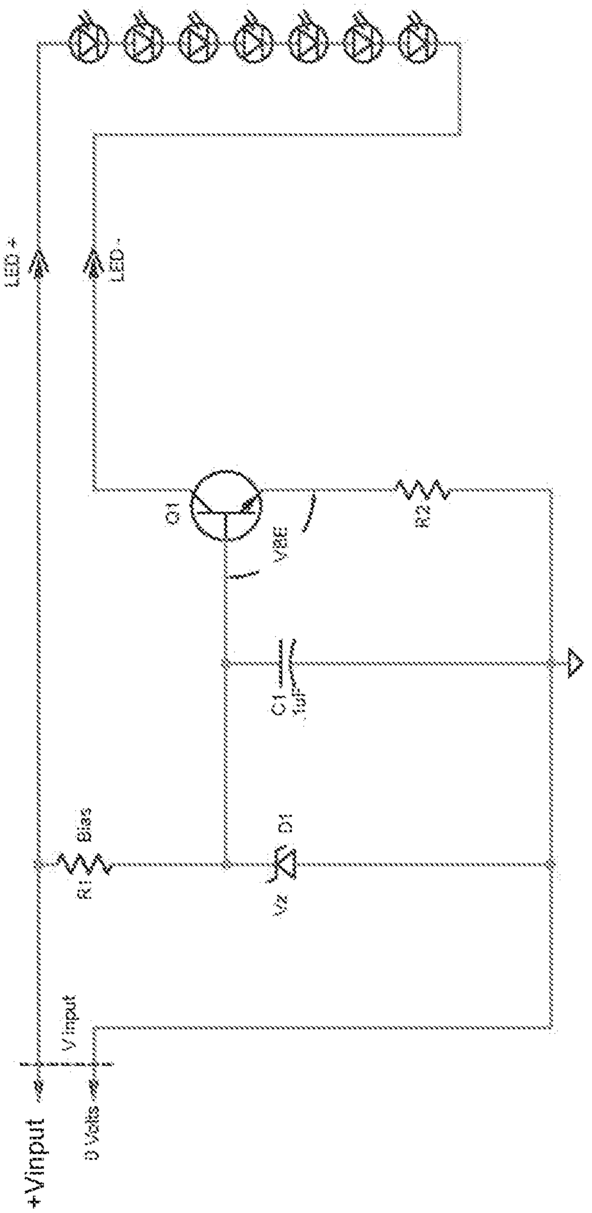
FIG. 2 Prior Art
FIG. 2 is a schematic diagram of a constant current transistor driver according to the prior art.

Referring to FIG. 2, a constant current transistor driver that does not include feedback or temperature compensation is depicted, according to the prior art.

This design has been used in various applications to generate a constant current. However, the design illustrated in FIG. 2 is not sufficient for the control of high-quality LED light fixtures. For example, when this circuit is used to drive LEDs in LED light fixtures, the control of the current provided to the LED strings in the various LED light fixtures (and among multiple color channels in an LED light fixture) is often inaccurate and inconsistent. This occurs for several reasons, which can include temperature variations among LED light fixtures and/or $V_{BE}$ variation in the transistor Q1 and in the Zener diode V2.

The $V_{BE}$ variation means the circuit is unsuitable for deep dimming and consistency of brightness between channels and/or fixtures. In high-quality LED light fixtures, the fixtures or channels cannot be dimmed over a full range of brightness, and some LED light fixtures or channels will emit a higher level of light than others. The disunity (i.e., inconsistency) in brightness and the truncated dimming range are not acceptable and are in fact variable based on the temperature, meaning that control will be unpredictable based on variations in temperature.

Figure 3:
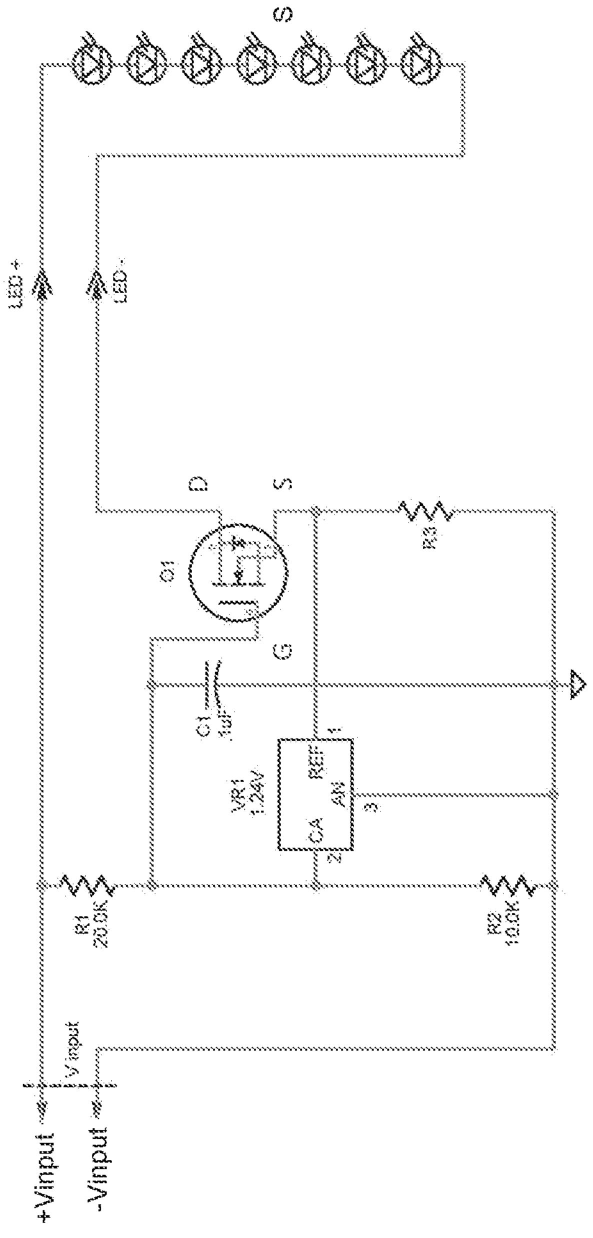
FIG. 3 is a schematic diagram of a configuration of an LED light fixture according to the invention using a PWM constant voltage to constant current LED regulator with both thermal compensation and current regulation and a FET to drive LEDs connected thereto.

Referring now to FIG. 3, a simple low-component count constant voltage PWM to constant current PWM driver for LEDs having both thermal compensation and true current regulation is depicted. This configuration uses a FET to regulate the current through the LED strings(S) and solves many problems in the previous designs shown in the prior art.

One challenge to providing a system with both thermal compensation and true current regulation and using only a 2-wire interface for each channel is that the system preferably does not have a relatively large amount of capacitance on the input supply. This is because the duty cycle of the PWM power supply is very narrow at low dimming levels, which one of skill in the art will recognize means the fixtures will essentially function as a short circuit if there is high input capacitance to the light fixtures. This system is therefore designed with very low input capacitance. This in turn allows the system to dim to true zero.

Another challenge to providing a system with both thermal compensation and true current regulation and using only a 2-wire interface is that the duty cycle of the signal driving the LED light fixtures changes based on the selected brightness level. This means it is difficult to create an active feedback system without a steady input DC source.

To achieve the above-described advantages, a $V_{REF}$ is provided that provides a reference source and output source that are independent (i.e., not tied together).

VR1 is used as the reference. This component does not need an independent input supply and has internal temperature compensation as well as an adjustable output as referenced to the reference input pin (REF), allowing this part to provide a bias to the FET and provide accurate current feedback when the circuit is constructed as shown in FIG. 3. The system as shown in FIG. 3 provides an accuracy up to about 1%, and preferably about 0.5%.

In this configuration, a constant voltage PWM input (+Vinput) from a controller is provided to a positive terminal of a relatively high input resistance (R1) and to a positive lead of the LED string(S). A negative terminal of the input resistance (R1) is connected to a cathode (CA) of a regulation circuit (VR1), to the gate (G) of a FET (Q1) and to the negative (−Vinput), optionally via a second resistance (R2). A reference terminal (REF) of the regulation circuit (VR1) is connected to the source(S) of the FET and to a positive terminal of a third resistor (R3). A negative terminal of the third resistor and the anode (AN) of the regulation circuit (VR1) are connected to the negative-Vinput. The regulation circuit (VR1) includes an internal variable voltage reference ($V_{REF}$) and internally compensates for variations in temperature.

A capacitor (C1) is connected between the gate (G) of the FET (Q1) and the negative-Vinput. The capacitor (C1) operates as a low-pass filter to smooth and filter out variations at very narrow PWM widths (i.e., very low duty cycle and light levels, such as 0-10%), which means the brightness is low and, without the filter, flicker can be an issue. In such a state, the circuit approaches or achieves an analog mode which allows dimming to a "true" zero level with no flicker, at narrow PWM pulse widths.

The resistance component in the filter is a combination of the output impedance of the reference chip (regulation circuit (VR1)) and the parallel combination of the R1 and R2 resistors. R1 and R2 also function to limit the reference high output due to it only being rated at 35V input, whereas the +Vinput can be higher, such as 48V.

A negative lead of the LED string(S) is connected to the drain (D) of the FET (Q1). This configuration provides for true constant current control while at the same time, automatically adjusts for variations in temperature through the variation in $V_{REF}$.

A particularly suitable device for the regulation circuit VR1 is the AZ431A or AZ431L three-terminal adjustable shunt regulator by The Diodes Inc. The AZ431A/L features guaranteed thermal stability over a full operation range, sharp turn-on characteristics, low temperature coefficient and low output impedance, The AZ431A/L is also a micropower device, requiring no independent power, and is compatible with constant voltage PWM power including at high frequencies (e.g., about 1250 Hz, or about 1000 Hz to 3000 Hz or more).

Figure 4:
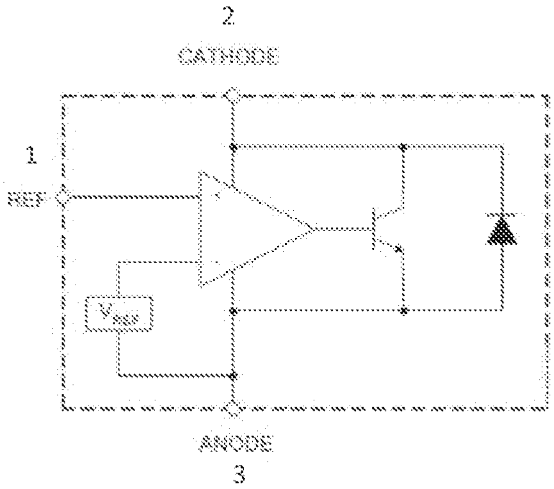
FIG. 4 is a functional block diagram of a regulation circuit according to FIG. 3.

FIG. 4 is a functional block diagram of the regulation circuit (VR1) with the reference (REF), cathode (CA), and anode (AN) depicted in the block diagram.

The circuit diagram disclosed in FIG. 3 minimizes temperature drift and maintains very accurate LED current, thereby solving the issues of the prior art circuits shown in FIGS. 1 and 2. The system as shown in FIG. 3 adjusts for wide temperature variations, for example ranging from about −40° C. up to about 125° C., with high precision, for example an accuracy up to about 0.5%. As can be seen, the thermal compensation is very good, which makes this circuit particularly advantageous in the applications where space is at a premium in the LED light fixture.

It should be noted that by using a low dropout in the reference voltage (1.24V), the dropout of the driver will be about that value, thus allowing for less heat on the R3 resistor, accounting for lower power losses. In calculating the value for R3, the formula is:

R3=1.24V/I LED, where I LED is the target constant current through the LEDs.

Some common values can include the following:

350 mA=3.54 Ω
500 mA=2.48 Ω
700 mA=1.77 Ω
1.05 A=1.18 Ω

It should further be noted that the FET Q1 in FIG. 3 requires much less bias power than the transistor Q1 in FIG. 2, which functions to save power. This can be significant when considering the system is only utilizing a low input voltage design (e.g., 12V or 48V). It should further be noted that the drop out voltage on the source of the FET is approximately 1.2V, which results in very high accuracy (e.g., appox. 0.5%).

Referring to FIGS. 3 and 4, one of skill in the art will recognize that adjustment of R2 and R3 will provide for different voltages applied to cathode 2 and allow for a variable $V_{REF}$ at reference 1 depending on the application.

Figure 5:
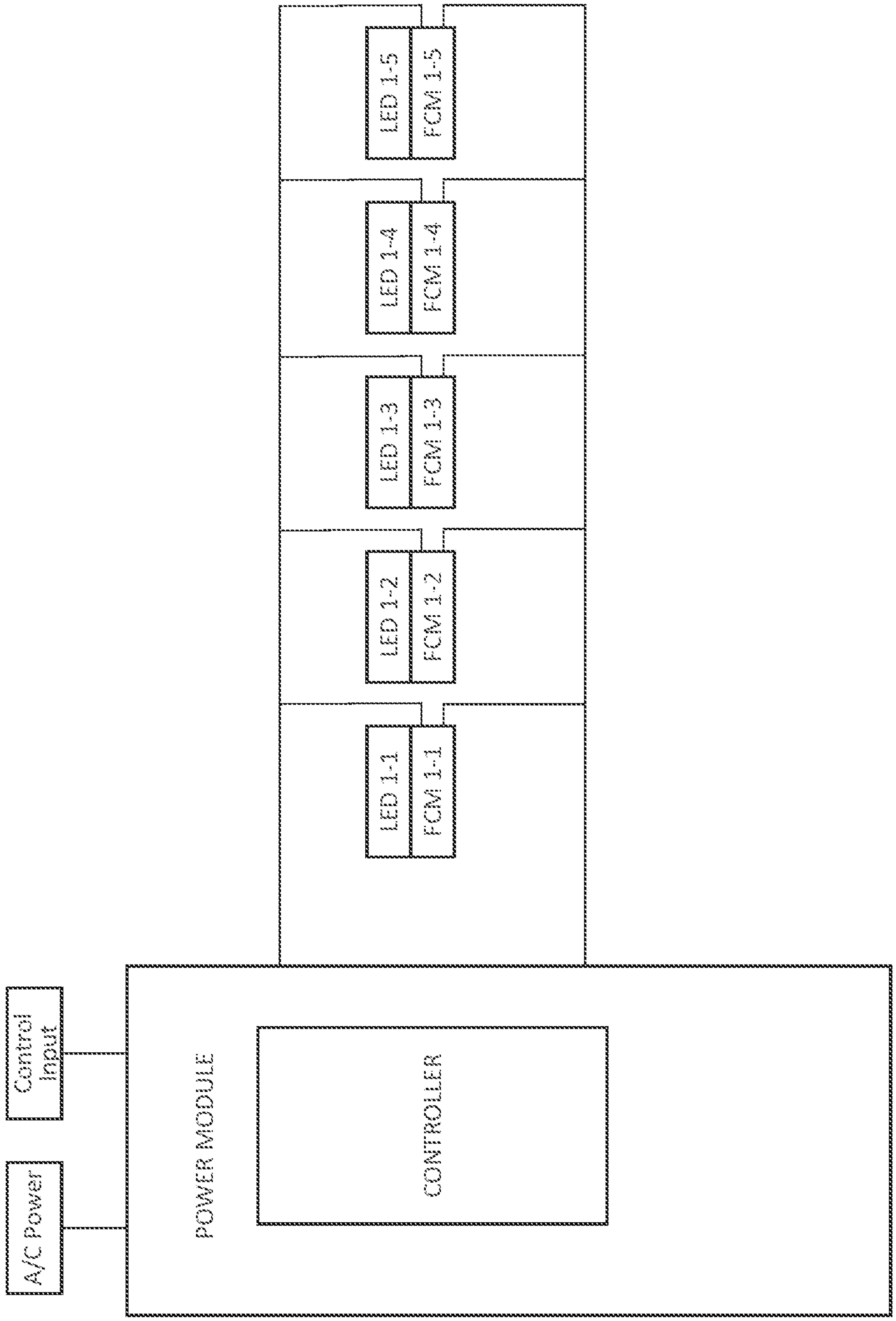
FIG. 5 is a block diagram of an LED lighting system having a plurality of LED light fixtures connected in parallel to a power module that includes a controller, in accordance with the invention.
Figure 6:
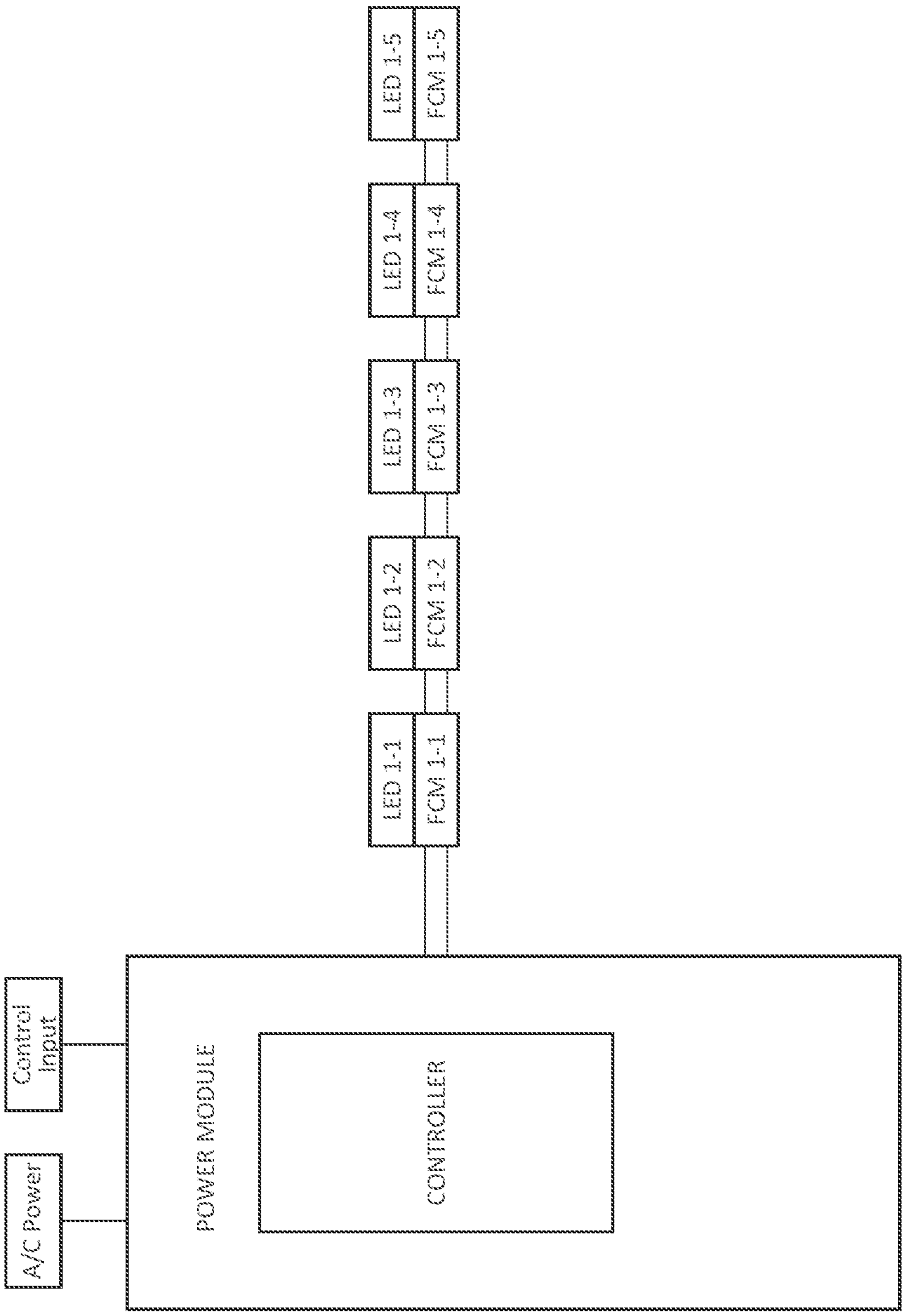
FIG. 6 is a block diagram of an LED lighting system having a plurality of LED light fixtures connected in parallel daisy-chain to a power module that includes a controller, in accordance with the invention.

Referring now to FIGS. 5 and 6, block diagrams are shown that illustrate two different LED light fixture connection configurations. In FIG. 5, a parallel connected-configuration is shown with multiple LED light fixtures, each comprising a Fixture Control Module (e.g., FCM 1-1) and an LED engine (e.g., LED 1-1). The wiring is connected to the FCM which is connected to the LED light engine containing one or more LED strings. As an example, the LED light fixture can be dispersed throughout a room or area or in several rooms or areas, with the controller located in the same or a different room or area.

Each LED light fixture can include a plurality of color channels (e.g., four channels-RGBW), which can be common to each LED light fixture, and the LED engine of each fixture can include a corresponding, independently controlled LED string for each channel. In such a configuration, the system can include a common control conductor for each color channel, connected between the controller and each light fixture in parallel.

While five LED light fixtures (1-1, 1-2, 1-3, 1-4, 1-5) are shown in FIG. 5, it is contemplated that a smaller or greater number of LED light fixtures may be connected to a single circuit connected to the controller. Additionally, while only one "circuit" of LED light fixtures is shown connected to the controller, it is contemplated that additional circuits (e.g., up to four) may be connected to the controller.

It should be noted that the circuit shown in FIG. 5 comprises a 2-wire connection which can be low-voltage Class 2 wiring, which greatly reduces the installation costs. In one configuration, it is contemplated that a single cable could be run to one or more LED light fixtures at a location remote from the Power Module where the cable includes four pairs of wires rated for 48V. Additionally, while the invention has been described in connection with utilizing only one pair of wires (two wires), it is contemplated that multiple pairs of wires can be connected in parallel to increase the current carrying capacity that can be delivered on one "circuit". For example, if two pairs of wires were parallel connected, this would double the current that could be delivered to one circuit of LED light fixtures. Additionally, if four pairs of wires were connected in parallel, this would again double the current carrying capacity of two parallel-connected pairs of wires. All of these configurations are contemplated in the description of a two-wire connection.

The control input can comprise virtually any type of control including a wall-mounted control such as a slide-type dimmer, or could comprise a wall-mounted interface that allows for a number of various pre-selected settings for brightness and color for the connected LED light fixtures, or could even comprise an input from a local or remote computer that is running a program for controlling the connected LED light fixtures.

FIG. 6 is similar to FIG. 5 with the exception that the LED light fixtures are parallel daisy-chain connected to the controller, such as via sequential segments of standard Ethernet wiring or other low-voltage Class 2 wiring. The discussion of the LED light fixtures, the controller, the Power Module and the control input are similar to that discussed in connection with FIG. 5.

Figure 7:
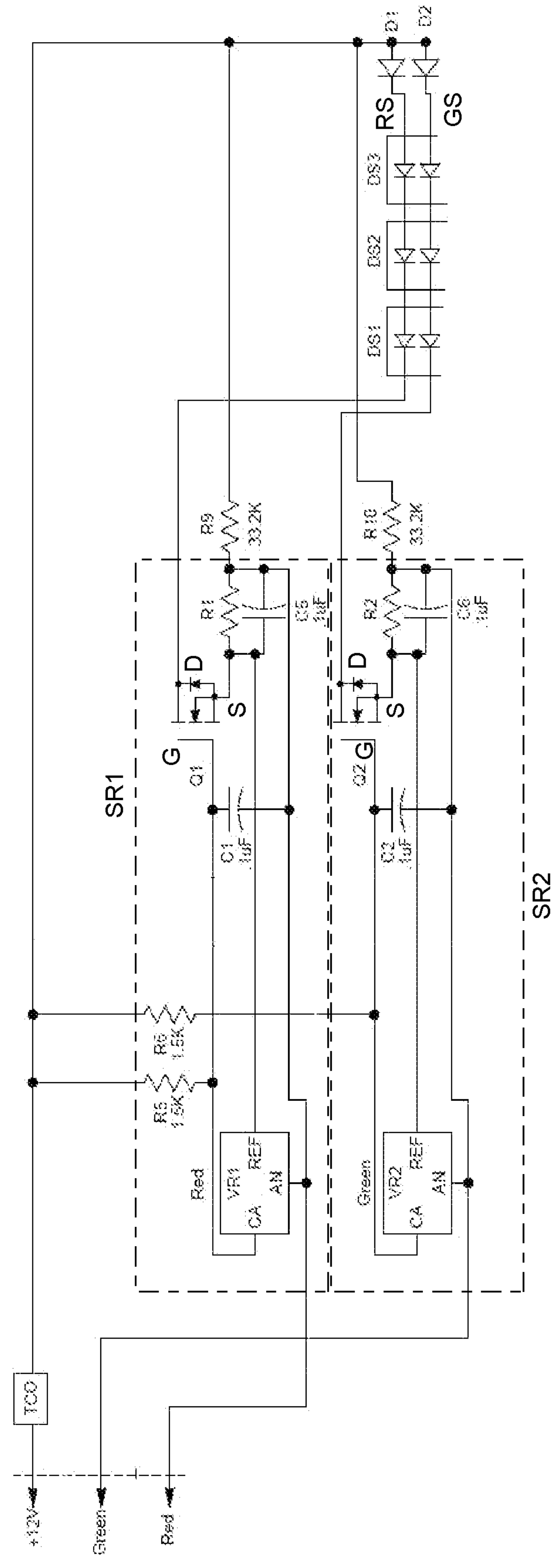
FIG. 7 is a schematic diagram of a configuration of a two color-channel LED light fixture according to the invention using, for each channel, a PWM constant voltage to constant current LED regulator with both thermal compensation and current regulation and a FET to drive a LED string of the color channel.

Referring to FIG. 7, an alternative configuration is shown of a two color-channel LED light fixture according to the invention using, for each channel, a PWM constant voltage to constant current LED regulator with both thermal compensation and current regulation and a FET to drive LEDs of the color channel. However, it can be appreciated that the system is also suitable for LED fixtures having a single color-channel or additional color channels, such as 4 color channels (e.g., RGBW).

In this configuration, the light emitting diode (LED) lighting system includes an LED light fixture having a first channel (for example Red) including a first LED string (RS) of one or more LEDs, which can be connected in series. The LED light fixture may also have a second channel (for example Green) including a second LED string (GS) of one or more LEDs, which can be connected in series.

The system also includes a controller as described and shown herein (e.g., FIGS. 5 and 6) which is adapted to receive a power input (e.g., A/C power) and a control input, and is adapted to provide a first constant voltage pulse-width modulated (PWM) power to the first channel of the LED light fixture in response to the control input. The controller is also adapted to provide a second constant voltage pulse-width modulated (PWM) power to the second channel of the LED light fixture in response to the control input, and independent of the first constant voltage PWM power.

The controller is preferably configured to provide (and the LED light fixture is adapted to receive) the first constant voltage pulse-width modulated (PWM) power to the first channel of the LED light fixture via a positive conductor (e.g., +12V) and a first negative conductor (Red). The controller is also preferably configured to provide (and the LED light fixture is adapted to receive) the second constant voltage pulse-width modulated (PWM) power to the second channel of the LED light fixture via the positive conductor (+12V) and a second negative conductor (Green).

The controller may be configured to provide (and the LED light fixture can be adapted to receive) a common positive constant voltage via the positive conductor (+12V) and an independent PWM sink for each of the first and second negative conductors, to independently control the first and second channels. Additionally, it can be appreciated that the first and second channels can have independent positive conductors (not shown).

The first channel of the LED light fixture has a first LED string (RS) which is preferably housed locally, within the LED light fixture and which is coupled to the positive conductor (+12V).

The first channel of the LED light fixture also has a series regulator (SR1) which is preferably housed locally, within the LED light fixture and which is operable to convert the constant voltage PWM power to constant current PWM power to regulate current through the associated first LED string (RS). The series regulator (SR1) preferably provides an internal voltage reference and internal temperature compensation. The series regulator (SR1) is preferably operable to regulate the current through the first LED string (RS) with high precision of at least about 0.5% over a wide temperature range, for example at least from about −40 C to about 125 C, and the series regulator is preferably powered solely by the first constant voltage PWM power, preferably without the use of a dedicated (e.g., "pony") power supply.

The series regulator preferably includes first and second resistances (R5, R1), a regulation circuit (VR1), a FET (Q1), and first and second capacitors (C1, C5, e.g., 1 μF). The first resistance (R5, e.g., 1.5KΩ) has a positive terminal coupled to the positive conductor (+12V) and to a positive lead of the first LED string (RS), and has a negative terminal coupled to a cathode (CA) of the regulation circuit (VR1) and a gate (G) of the FET (Q1). An anode (AN) of the regulation circuit (VR1) is coupled to the first negative conductor (Red).

The first capacitor (C1) is preferably connected between the gate (G) of the FET (Q1) and the first negative conductor (Red).

A drain (D) of the FET (Q1) is preferably connected to a negative lead of the first LED string (RS) and a source of the FET is preferably connected to a reference terminal (REF) of the regulation circuit (VR1).

The second resistance (R1) preferably has a positive lead coupled to the source(S) of the FET (Q1) and has a negative lead coupled to the first negative conductor (Red).

The second capacitor (C5) preferably has a positive lead coupled to the source(S) of the FET (Q1) and has a negative lead coupled to the first negative conductor (Red).

The regulation circuit (VR1) preferably has an internal voltage reference and internal temperature compensation, and the regulation circuit is preferably powered solely by the first constant voltage PWM power.

The lighting system is preferably operable to dim the first LED string (RS) from 100 percent to zero or near zero percent at high PWM frequencies in stable manner, without perceptible artifacts such as flicker or jitter.

The second channel of the LED light fixture preferably has a series regulator configured as described here with respect to the first channel and operable to convert the second constant voltage PWM power to constant current PWM power to regulate current through the second LED string (GS), independent of the first LED string (RS).

The second channel of the LED light fixture has a second LED string (GS) which is preferably housed locally, within the LED light fixture and which is coupled to the positive conductor (+12V).

The second channel of the LED light fixture preferably also has a series regulator (SR2) which is preferably housed locally, within the LED light fixture and which can be configured as described herein with respect to the series regulator (SR1) of the first channel. The series regulator (SR2) of the second channel is preferably operable to convert the second constant voltage PWM power to constant current PWM power to regulate current through the second LED string (GS).

The series regulator (SR2) of the second channel preferably provides an internal voltage reference and internal temperature compensation. The series regulator (SR2) is preferably operable to regulate the current through the second LED string (GS) with high precision of at least about 0.5% over a wide temperature range, for example at least from about-40C to about 125 C, and the series regulator is preferably powered solely by the second constant voltage PWM power, preferably without the use of a dedicated (e.g., "pony") power supply.

The series regulator (SR2) preferably includes first and second resistances (R6, R2), a regulation circuit (VR2), a FET (Q2), and first and second capacitors (C2, C6). The first resistance (R6) can have a positive terminal coupled to the positive conductor (+12V) and to a positive lead of the second LED string (GS), and has a negative terminal coupled to a cathode (CA) of the regulation circuit (VR2) and a gate (G) of the FET (Q2). An anode (AN) of the regulation circuit (VR2) is coupled to the second negative conductor (Green).

The first capacitor (C2) is preferably connected between the gate (G) of the FET (Q2) and the second negative conductor (Green).

A drain (D) of the FET (Q2) is preferably connected to a negative lead of the first LED string (GS) and a source of the FET is preferably connected to a reference terminal (REF) of the regulation circuit (VR2).

The second resistance (R2) preferably has a positive lead coupled to the source(S) of the FET (Q2) and has a negative lead coupled to the second negative conductor (Green).

The second capacitor (C6) preferably has a positive lead coupled to the source(S) of the FET (Q2) and has a negative lead coupled to the second negative conductor (Green).

The regulation circuit (VR2) preferably has an internal voltage reference and internal temperature compensation, and the regulation circuit is preferably powered solely by the second constant voltage PWM power.

The lighting system is preferably operable to dim the second LED string (GS) from 100 percent to zero or near zero percent at high PWM frequencies in a visually aesthetic manner, for example without perceptible flicker or jitter.

During periods of low dim value of a channel, inductive coupling between adjacent negative conductors for the color channels leading (sometimes a substantial distance) from the controller to the LED light fixture can cause unwanted transient illumination (e.g., flickering) of the low channel. To reduce or prevent inductive coupling between the channels, the LED fixture can include a resistance coupled between the positive conductor and each negative conductor. For example, as depicted, the LED fixture can include a resistance (R9, e.g., 33.2K Ω) coupled between the positive conductor (+12V) and the first negative conductor (Red) and a resistance (R10) coupled between the positive conductor (+12V) and the second negative conductor (Green).

During periods of low dim value of a channel, optically induced reverse bias between (sometimes closely adjacent) LED strings of independent color channels of an LED light fixture can cause unwanted illumination (e.g., flickering) of the low channel. To reduce or prevent optically induced reverse bias between LED strings, the LED fixture can include a diode in series with each LED string. For example, as depicted, the LED fixture can include a diode (D1) in series with the first LED string (RS) and a diode (D2) in series with the second LED string (GS), where the diodes are operable to prevent reverse bias in the associated first and second LED strings, respectively.

The system may also include a thermal cut-off (TCO) operable to permanently or temporarily disconnect or reduce power to the LED light fixture in the event that a temperature related to the LED light fixture or components thereof exceeds a predetermined value, for example for a predetermined amount of time.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A light emitting diode (LED) lighting system comprising:

an LED light fixture having a first channel including a first LED string of one or more LEDs connected in series;

a controller adapted to receive a power input and a control input, and adapted to provide a first constant voltage pulse-width modulated (PWM) power to the first channel of the LED light fixture in response to the control input;

the first channel of the LED light fixture having a first series regulator operable to convert the constant voltage PWM power to constant current PWM power to regulate current through the first LED string;

the first series regulator providing an internal voltage reference and internal temperature compensation;

the first series regulator being operable to regulate the current through the first LED string with high precision over a wide temperature range;

the first series regulator being powered solely by the first constant voltage PWM power; and the LED lighting system being operable to dim the first LED string from 100 percent to zero or near zero percent at PWM frequencies at or above 1250 Hz.

2. The light emitting diode (LED) lighting system as in claim 1, wherein:

the controller is configured to provide the first constant voltage pulse-width modulated (PWM) power to the first channel of the LED light fixture via a positive conductor and a first negative conductor;

the first LED string having a positive lead coupled to the positive conductor;

the first series regulator having:

first and second resistances, a regulation circuit, a FET, and first and second capacitors;

the first resistance having a positive terminal coupled to the positive conductor;

the first resistance having a negative terminal coupled to a cathode of the regulation circuit and a gate of the FET;

an anode of the regulation circuit being coupled to the first negative conductor:

the first capacitor being connected between the gate of the FET and the first negative conductor;

a drain of the FET being connected to a negative lead of the first LED string:

a source of the FET being connected to a reference terminal of the regulation circuit;

the second resistance having a positive lead coupled to the source of the FET and having a negative lead coupled to the first negative conductor:

the second capacitor having a positive lead coupled to the source of the FET and having a negative lead coupled to the first negative conductor;

the regulation circuit providing an internal voltage reference and internal temperature compensation; and the regulation circuit being powered solely by the first constant voltage PWM power.

3. The light emitting diode (LED) lighting system as in claim 1, wherein:

the LED light fixture includes a second channel including a second LED string of one or more LEDs connected in series;

the controller being adapted to provide a second constant voltage pulse-width modulated (PWM) power to the second channel of the LED light fixture in response to the control input, and independent of the first constant voltage PWM power;

the second channel of the LED light fixture including a second series regulator operable to convert the second constant voltage PWM power to constant current PWM power to regulate current through the second LED string, independent of the first LED string;

the second series regulator providing an internal voltage reference and internal temperature compensation;

the second series regulator being operable to regulate the current through the second LED string with high precision over a wide temperature range;

the second series regulator being powered solely by the second constant voltage PWM power; and the lighting system being operable to dim the second LED string from 100 percent to zero or near zero percent at PWM frequencies at or above 1250 H.

4. The light emitting diode (LED) lighting system as in claim 3, further comprising:

the controller being configured to provide the first constant voltage pulse-width modulated (PWM) power to the first channel of the LED light fixture via a positive conductor and a first negative conductor;

the controller being configured to provide the second constant voltage pulse-width modulated (PWM) power to the second channel of the LED light fixture via the positive conductor and a second negative conductor;

the first LED string having a positive lead coupled to the positive conductor;

the first series regulator having:

first and second resistances, a first regulation circuit, a first FET, and first and second capacitors;

the first resistance having a positive terminal coupled to the positive conductor:

the first resistance having a negative terminal coupled to a cathode of the first regulation circuit and a gate of the first FET;

an anode of the first regulation circuit being coupled to the first negative conductor;

the first capacitor being connected between the gate of the first FET and the first negative conductor;

a drain of the first FET being connected to a negative lead of the first LED string;

a source of the first FET being connected to a reference terminal of the first regulation circuit;

the second resistance having a positive lead coupled to the source of the first FET and a negative lead coupled to the first negative conductor; and the second capacitor having a positive lead coupled to the source of the first FET and a negative lead coupled to the first negative conductor;

the first regulation circuit providing an internal voltage reference and internal temperature compensation; and the first regulation circuit being powered solely by the first constant voltage PWM power:

the second LED string having a positive lead coupled to the positive conductor;

the second series regulator having:

third and fourth resistances, a second regulation circuit, a second FET, and third and fourth capacitors;

the third resistance having a positive terminal coupled to the positive conductor:

the third resistance having a negative terminal coupled to a cathode of the second regulation circuit and a gate of the second FET;

an anode of the regulation circuit being coupled to the second negative conductor:

the third capacitor being connected between the gate of the second FET and the second negative conductor;

a drain of the second FET being connected to a negative lead of the second LED string:

a source of the second FET being connected to a reference terminal of the second regulation circuit;

the fourth resistance having a positive lead coupled to the source of the second FET and a negative lead coupled to the second negative conductor; and the fourth capacitor having a positive lead coupled to the source of the second FET and a negative lead coupled to the second negative conductor;

the second regulation circuit providing an internal voltage reference and internal temperature compensation; and the second regulation circuit being powered solely by the second constant voltage PWM power.

5. The light emitting diode (LED) lighting system as in claim 4, wherein:

the LED light fixture includes means to prevent inductive coupling between the first and second negative conductors.

6. The light emitting diode (LED) lighting system as in claim 5, wherein:

the means to prevent inductive coupling between the first and second negative conductors comprises a fifth resistance coupled between the positive conductor and the first negative conductor, and comprises a sixth resistance coupled between the positive conductor and the second negative conductor.

7. The light emitting diode (LED) lighting system as in claim 4, further comprising:

means to prevent optically-induced reverse bias between the first LED string and the second LED string.

8. The light emitting diode (LED) lighting system as in claim 7, wherein:

the means to prevent optically-induced reverse bias between the first LED string and the second LED string comprises the first LED string including a first diode in series with the one or more LEDs of the first LED string, and comprises the second LED string including a second diode in series with the one or more LEDs of the second LED string; and the first and second diodes being operable to prevent reverse bias in the first and second LED strings, respectively.

9. The light emitting diode (LED) lighting system as in claim 1, wherein:

the lighting system is operable to dim the first LED string from 100 percent to zero or near zero percent at PWM frequencies at or above 1250 Hz without perceptible flicker or jitter.

10. The LED lighting system of claim 1, wherein the first series regulator comprises a linear, feedback-controlled current regulation circuit, the regulator including a current-representative feedback path coupled to the first LED string and a series pass device coupled in series with the first LED string and controlled by the regulation circuit in response to the current-representative feedback path, the regulator being powered solely by the first constant voltage PWM power and providing high-precision regulation of the current through the first LED string over a wide temperature range.

11. The LED lighting system of claim 10, wherein the current-representative feedback path comprises a sense resistor coupled in series with the first LED string, the voltage across the sense resistor being applied to the regulation circuit to regulate current through the first LED string.

12. The LED lighting system of claim 10, wherein the series pass device is a transistor selected from the group consisting of a bipolar junction transistor, a metal-oxide-semiconductor field-effect transistor (MOSFET), and an insulated-gate bipolar transistor (IGBT), and wherein the regulation circuit includes a compensation network configured to maintain stability and high-precision current regulation across variations in input voltage, LED forward voltage, and temperature.

13. A light emitting diode (LED) light fixture comprising:

a first channel including a first LED string of one or more LEDs connected in series;

the LED light fixture being adapted to receive a first constant voltage pulse-width modulated (PWM) power to the first channel of the LED light fixture;

the first channel of the LED light fixture having a first series regulator operable to convert the constant voltage PWM power to constant current PWM power to regulate current through the first LED string;

the first series regulator providing an internal voltage reference and internal temperature compensation;

the first series regulator being operable to regulate the current through the first LED string with high precision over a wide temperature range;

the first series regulator being powered solely by the first constant voltage PWM power; and the light fixture being operable to dim the first LED string from 100 percent to zero or near zero percent at PWM frequencies at or above 1250 Hz without perceptible flickering.

14. The light emitting diode (LED) light fixture as in claim 13, wherein:

the LED light fixture is adapted to receive the first constant voltage pulse-width modulated (PWM) power to the first channel of the LED light fixture via a positive conductor and a first negative conductor;

a positive lead of the first LED string being coupled to the positive conductor;

the first series regulator having:

first and second resistances, a regulation circuit, a FET, and first and second capacitors;

the first resistance having a positive terminal coupled to the positive conductor;

the first resistance having a negative terminal coupled to a cathode of the regulation circuit and a gate of the FET;

an anode of the regulation circuit being coupled to the first negative conductor;

the first capacitor being connected between the gate of the FET and the first negative conductor:

a drain of the FET being connected to a negative lead of the first LED string;

a source of the FET being connected to a reference terminal of the regulation circuit:

the second resistance having a positive lead coupled to the source of the FET and having a negative lead coupled to the first negative conductor;

the second capacitor having a positive lead coupled to the source of the FET and having a negative lead coupled to the first negative conductor;

the regulation circuit providing an internal voltage reference and internal temperature compensation; and the regulation circuit being powered solely by the first constant voltage PWM power.

15. The light emitting diode (LED) light fixture as in claim 13, wherein:

the LED light fixture includes a second channel including a second LED string of one or more LEDs connected in series;

the LED light fixture being adapted to receive a second constant voltage pulse-width modulated (PWM) power to the second channel of the LED light fixture, independent of the first constant voltage PWM power;

the second channel of the LED light fixture including a second series regulator operable to convert the second constant voltage PWM power to constant current PWM power to regulate current through the second LED string, independent of the first LED string;

the second series regulator providing an internal voltage reference and internal temperature compensation;

the second series regulator being operable to regulate the current through the second LED string with high precision over a wide temperature range;

the second series regulator being powered solely by the second constant voltage PWM power; and the lighting system being operable to dim the second LED string from 100 percent to zero or near zero percent at PWM frequencies at or above 1250 Hz without perceptible flicker or jitter, and independent of the first LED string.

16. The light emitting diode (LED) light fixture as in claim 15, wherein:

the LED light fixture is adapted to receive the first constant voltage pulse-width modulated (PWM) power to the first channel of the LED light fixture via a positive conductor and a first negative conductor;

the LED light fixture being adapted to receive the second constant voltage pulse-width modulated (PWM) power to the second channel of the LED light fixture via the positive conductor and a second negative conductor;

the first LED string having a positive lead coupled to the positive conductor;

the first series regulator having:

first and second resistances, a first regulation circuit, a first FET, and first and second capacitors;

the first resistance having a positive terminal coupled to the positive conductor:

the first resistance having a negative terminal coupled to a cathode of the first regulation circuit and a gate of the first FET;

an anode of the first regulation circuit being coupled to the first negative conductor;

the first capacitor being connected between the gate of the first FET and the first negative conductor;

a drain of the first FET being connected to a negative lead of the first LED string;

a source of the first FET being connected to a reference terminal of the first regulation circuit;

the second resistance having a positive lead coupled to the source of the first FET and a negative lead coupled to the first negative conductor; and the second capacitor having a positive lead coupled to the source of the first FET and a negative lead coupled to the first negative conductor;

the first regulation circuit providing an internal voltage reference and internal temperature compensation; and the first regulation circuit being powered solely by the first constant voltage PWM power;

the second LED string having a positive lead coupled to the positive conductor;

the second series regulator having;

third and fourth resistances, a second regulation circuit, a second FET, and third and fourth capacitors;

the third resistance having a positive terminal coupled to the positive conductor;

the third resistance having a negative terminal coupled to a cathode of the second regulation circuit and a gate of the second FET;

an anode of the regulation circuit being coupled to the second negative conductor;

the third capacitor being connected between the gate of the second FET and the second negative conductor;

a drain of the second FET being connected to a negative lead of the second LED string;

a source of the second FET being connected to a reference terminal of the second regulation circuit;

the fourth resistance having a positive lead coupled to the source of the second FET and a negative lead coupled to the second negative conductor; and the fourth capacitor having a positive lead coupled to the source of the second FET and a negative lead coupled to the second negative conductor;

the second regulation circuit providing an internal voltage reference and internal temperature compensation; and the second regulation circuit being powered solely by the second constant voltage PWM power.

* * * * *